United States Patent [19]
Bolle et al.

[11] Patent Number: 5,631,976
[45] Date of Patent: May 20, 1997

[54] OBJECT IMAGING SYSTEM

[75] Inventors: Rudolf M. Bolle, Bedford Hills; Jonathan H. Connell, Cortlandt-Manor; Norman Haas, Mount Kisco, all of N.Y.; Rakesh Mohan, Stamford, Conn.; Gabriel Taubin, Hartsdale, N.Y.

[73] Assignee: International Business Machines Corporation, Armonk, N.Y.

[21] Appl. No.: 235,064

[22] Filed: Apr. 29, 1994

[51] Int. Cl.$^6$ .................................................. G06K 9/00
[52] U.S. Cl. .................. 382/174; 382/171; 382/274; 358/464
[58] Field of Search .......................... 382/8, 9, 171, 382/173, 174, 274; 235/460; 348/135, 92, 370, 227; 358/464

[56] References Cited

U.S. PATENT DOCUMENTS

| | | | |
|---|---|---|---|
| 4,314,281 | 2/1982 | Wiggins et al. | 358/280 |
| 4,861,973 | 8/1989 | Hellekson et al. | 235/467 |
| 5,058,178 | 10/1991 | Ray | 382/8 |
| 5,091,963 | 2/1992 | Litt et al. | 382/8 |
| 5,115,122 | 5/1992 | Jwo et al. | 235/467 |
| 5,220,614 | 6/1993 | Crain | 382/8 |
| 5,224,141 | 6/1993 | Yassa et al. | 378/99 |

OTHER PUBLICATIONS

S. Mersch, "Polarized Lighting for Machine Vision Applications," in Proc. of RI/SME Third Annual Applied Machine Vision Conf., Feb. 1984, pp. 40–54. Schaumburg.

B.G. Batchelor, D.A. Hill&D.C. Hodgson, "Automated Visual Inspection" IFS (Publications) Ltd. UK, North–Holland (A Div. ofElsevier Science Publishers BV) 1985 pp. 39–178.

*Primary Examiner*—Leo Boudreau
*Assistant Examiner*—Chris Kelley
*Attorney, Agent, or Firm*—Louis J. Percello

[57] ABSTRACT

An image processing system segments an object from the background of a scene by controlling a light source to illuminate the object more in one scene image than in another scene image. The two scene images are captured by an image input device and are then compared. The part of the image that experienced an increase in intensity is segmented as corresponding to the object. The image input device and the light source can also be placed in an opaque enclosure with an opening through which the input device can view and the light can illuminate the object. By placing the enclosure the correct distance away from the object, the effects of ambient light on the image are removed. Object glare is removed by a polarizing filter system.

19 Claims, 4 Drawing Sheets

OBJECT IMAGING SYSTEM

FIELD OF THE INVENTION

This invention relates to the field of image processing and computer vision. More specifically, the invention relates to an apparatus and method for taking images of objects independent of the background and/or of the ambient illumination.

BACKGROUND OF THE INVENTION

There are various prior art image processing and computer vision systems which acquire and/or process images of a scene. (Generally, a scene includes a background and one or more objects.) Typically, in these systems, an analog image from a camera is converted to a discrete representation by dividing the picture into a fixed number of locations called picture elements, or pixels, and quantizing the brightness of the image at those picture elements into a fixed number of values. Thus, much of the prior art develops a digital image of the actual image or scene and then processes the digital image using a computer. This processing, also called image processing or computer vision, includes modifying the scene image or obtaining properties from the scene image such as the identity or location of the object in the scene.

During the image processing of the scene, the the object (or objects) that is (are) of interest are imaged along with the scene surroundings. These surroundings are called the background. The background is usually further away from the camera than the object(s) of interest. In some types of image processing it is necessary to separate the object(s) image from the background image of the scene. This separation is called figure/ground separation or segmentation.

Objects in the scene are illuminated when light falls on the object(s). Ambient illumination is the illumination due to light sources occurring in the environment such as the sun outdoors and room lights indoors. Thus ambient illumination is illumination from any light source except the special lights used specifically for imaging an object. Some illuminating light is reflected from the object(s). Some reflected light may be glare (also called specular reflection) which is the high amount of light reflected off a shiny object. The color of the glare is mostly that of the illuminating light (as opposed to the natural color of the object).

STATEMENT OF PROBLEMS WITH THE PRIOR ART

Prior art image processing systems can not easily separate objects of interest from the background of the scene. For example, there are systems which inspect or recognize parts in an assembly line from an image of those parts. There are special effects systems which mix the image of actors with special backgrounds which may be created separately by computers. These systems obtain an image of the object amenable to processing by presenting the object against a background which is readily and simply distinguishable from the object. For instance, parts inspection systems may image the parts against a black or white surface. Special effects systems usually require the actors to be imaged before a blue surface. These and many other systems will fail if the background is arbitrary and not specially controlled.

Also, some prior art systems have difficulty determining object properties in varying ambient light. For example, some image processing and computer vision systems work by making measurements on the image. Many such systems measure the color or intensity in the image. These color and intensity measurements depend on the the light illuminating the imaged object. Thus, these systems require either the object to be enclosed in a specially lighted chamber or need to control all the light in space the image is taken, i.e. all the light on a factory floor or a studio. Therefore, systems which measure object color and/or intensity or depend on measurement of image color and/or intensity may fail if the object is presented in different ambient light.

Glare reflected from shiny surfaces also presents problems that are difficult to solve for many prior art image processing systems. Image processing and computer vision systems have difficulty imaging shiny surfaces such as glass plates or metallic objects due the glare generated by light reflecting off these shiny surfaces. This is because glare reflected into the imaging system obscures the object, masks certain surface features, or is interpreted incorrectly as a intentional mark.

OBJECTS OF THE INVENTION

An object of this invention is an improved apparatus and method for imaging objects independently and separately of the background.

A further object of this invention is an improved apparatus and method for imaging objects with precisely controlled light independent and unaffected by any ambient illumination.

Another object of this invention is an improved apparatus and method for removing glare from images of shiny objects.

Another object of this invention is an improved apparatus and method for imaging and segmenting objects independent of background, ambient illumination and glare.

SUMMARY OF THE INVENTION

The present invention is a novel system and method for image processing so that one or more objects in the scene can be segmented from the scene background. The invention comprises a light source (or other electromagnetic or acoustic radiation source) placed at a distance from the object(s) so that the object appears brighter to a image input device than when the light is turned off or is reduced in intensity. To properly separate the object, the background must exhibit less of a brightening. Two images of the object are taken in which the light is controlled to illuminate the object more in one image than the other. The images are compared, preferably on a pixel by pixel basis, and the parts of the image with increased intensity are segmented as corresponding to the object.

In another preferred embodiment of the invention, the image input device and the light source are placed in an opaque enclosure with an opening through which the image input device can view the object and the light can illuminate the object. The object is placed close to this opening so that the part of the object viewed by the image input device is illuminated almost entirely by the light and not by the ambient illumination. In this manner, the effects of ambient illumination are eliminated from the imaging.

To remove glare from an object, the light is linearly polarized (either inherently or through use of a filter) and the image input device is fitted with a linear polarization filter whose direction of polarization is orthogonal to the direction of polarization of the light. The glare or specular reflection maintains the polarization of the light source and thus does not pass through the filter on the image input device while the diffuse reflection from the object (i.e. the remainder of the light coming back from the object) is randomly polarized and a portion is able to reach the image input device. Thus the image input device images the object without any glare.

DETAILED DESCRIPTION OF THE INVENTION

Figures 1, 1A:
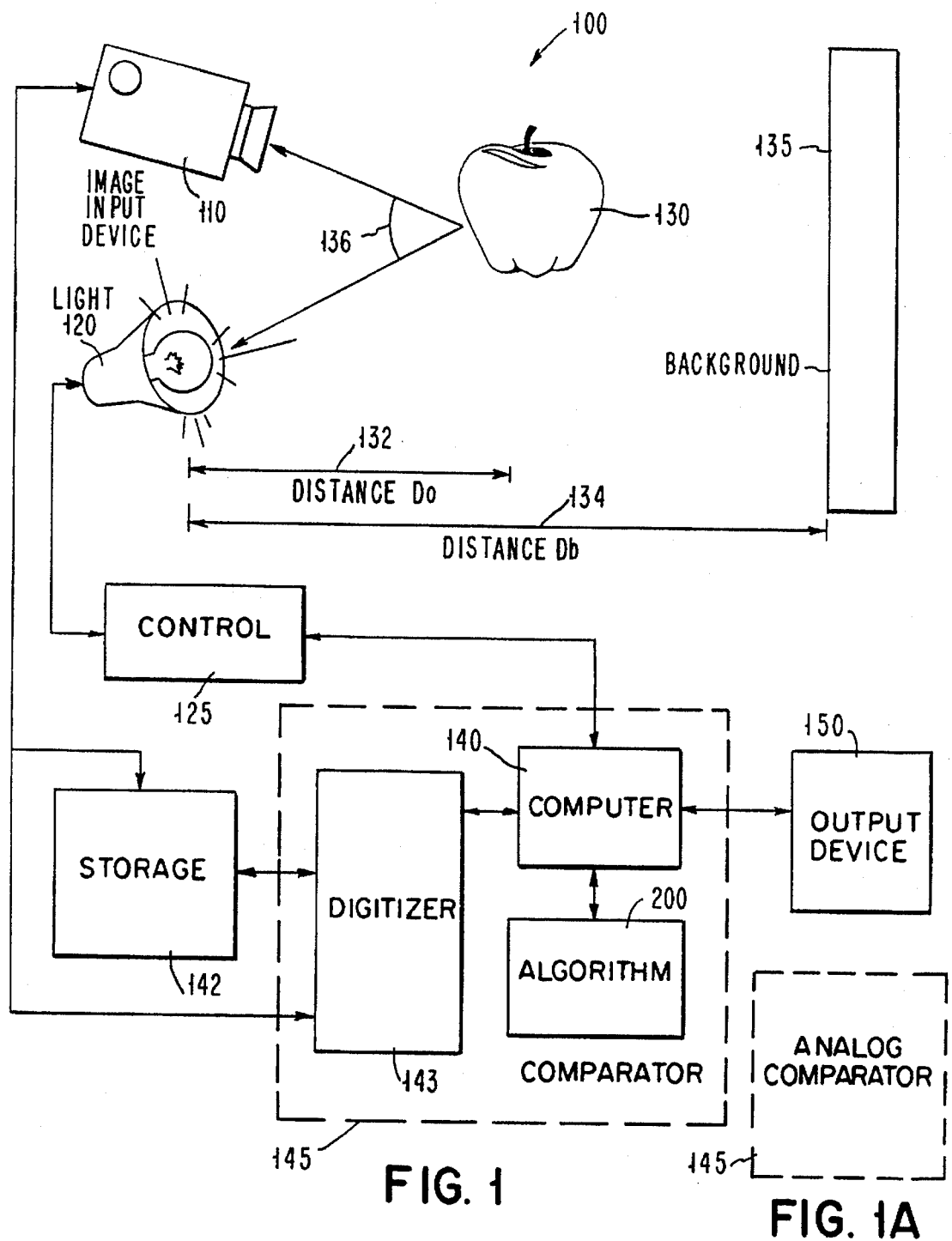
FIG. 1 is a block diagram of two preferred apparatus, digital and analog (FIG. 1a) of the present invention that is used to image an object separately from its background.

FIG. 1 is a block diagram that shows two preferred embodiments of the present apparatus. Each apparatus shown is capable of imaging an object separate from any background. The novel apparatus enables the imaging of an object in a scene completely segmented from the background. Therefore, the image of the object can be processed without any interference from the background image of the scene. In addition, during the processing, various backgrounds can be added to the segmented object image to create different scenes.

The present apparatus comprises an image input device 110 that develops an image of a scene that includes a background 135 and one or more objects 130. The objects are illuminated by a light source 120 that is a first distance 132 from the object 130 and a second distance 134 from the background 135. The light 120 is controlled by a control 125 that switches the light 120 in a manner so that the image input device 110 obtains a lighted image of the object and a dark image of the object. (See FIG. 2.) The image can be stored in a storage device 142 and can also be fed to a comparator 145 where it is processed. The comparator 145 may comprise a digital device, like a computer 140, running the novel algorithm 200 (also shown in FIG. 2) or may be an analog device that also performs the same algorithmic functions 200. The comparator 145 also triggers or is synchronized with the control 125 to obtain the lighted and dark image. The apparatus also optionally includes an output device 150, like a video monitor, for displaying the scene and/or processed object image. The video monitor 150 can also provide a user with control functions for manually operating the system.

The image input device 110 can be a video camera, a charged coupled device (CCD) camera, a charged injection device (CID), or any other known input device for generating images. The image input device 110 can be sensitive to any general electromagnetic energy and includes light (either black and white, or color), infrared, and/or ultraviolet, depending upon the requirements of the application. Below these electromagnetic energy ranges will be referred to as "light" with no loss in generality intended. Preferred embodiment of the image input device is Sony card-camera CCB-C35YC or Sony XC-999.

The light 120 can be any electromagnetic energy source that is dictated by the application and is compatible with the image input device. For example, if a purpose of the system is to image properties of the object that are measured using ultraviolet light, the light 120 would emit light in the ultraviolet energy spectrum and the image input device 110 would be sensitive to energy in this range. One or more lights can be used. The individual light types include flash, strobe, and/or fluorescent light. Different types of lights can be used together. For example, the different lights in the combination might emit light of different colors. Some preferred lights 120 include flash tubes Mouser U-4425 or two GE cool-white fluorescent bulbs (22 Watts and 30 Watts), GE FC8T9-CW and GE FC12T9-CW, respectively or equivalents.

The light control 125 switches one or more of the lights 120 on and off, or switches the lights 120 so that they change their output intensity level. The control 125 can be triggered by any means that is known in the art, e.g., a separate light controller, a fixed interval timer (like a strobe light controller), a circuit that responds to the vertical sync pulse of a video signal, or a manual switch. One preferred light control 125 trigger is a digital output that is provided by the comparator 145, in particular the computer 140. The control may be synchronized with functions in the video input device 110 or the comparator 145 (computer 140) or both.

The object 130 can be any object that is to be imaged; that is, any object capable of reflecting electromagnetic energy back to the image input device 110. Examples would include produce at a supermarket checkout, bulk items (like hardware or packaged goods) on a conveyer, and actors or objects on a stage or movie set.

One novel feature of the present invention is the distance relationships between the light 120 and the object 130 and the background 135. The first distance 132 between the light 120 and the object 130, is short so that the light 120 illuminates the object 130 much more strongly than the background 135. The second distance 134 between the light 120 and the background 135 is larger so that the light 120 illuminates the background 135 very weakly. This difference in illumination enables the invention 100 to separate or segment the object 130 from the background 135. The required relative difference in illumination of the object and background depends on their relative reflectivities. Let Ro denote what percentage of the incident light is reflected by the object. Similarly, let Rb denote the reflectance of the background. Further, let the object distance 132 be called Do and the background distance 134 be called Db. For the separation procedure to work it must be the case that: $Ro/Do^2 > Rb/Db^2$.

Angle 136 is the angle between a ray from the light 120 to the object 130 and another ray from the object 130 to the camera 110. This angle 136 should be small so that the entire part of the object 130 imaged by the image input device 110 is illuminated by the light 120. This angle must generally be less than 90 degrees. A more preferred angle is between 0 and 15 degrees. The most preferred angle is close to zero. One way to achieve an angle 136 of zero degrees is to encircle the image input device 110 with the light 120. Alternatively, the object 130 can be illuminated by more than one light 120 each of which is located at a different location surrounding the image input device 110.

The comparator 145 novelly compares two images of the scene. A first image that is compared is an image of the scene that is not illuminated by the light 120 or illuminated by the light 120 at a low intensity. A second image that is compared is an image of the scene that is illuminated by the light 120 at full or at a higher intensity. The difference in light intensity illuminating the two images must be enough so that the image of the object 130 appears brighter in the more illuminated image. Thus, given the first 132 and second 134 distances, the components of the system 100, and the application, the necessary light intensity difference that creates the two compared images must be great enough to permit the system 100 to distinguish the object 130 from the background 135. For instance, if the camera's analog electronics is only linear to 1% then the measured change in object brightness must be more than 1%. Similarly, if the video signal is digitized to 8 bits, the measured brightness must increase by more than one count (0.39%). Generally, it is desirable to have a larger difference that this. An increase on the order of 2%–10% works well in practice. Differences greater than 10% are more preferred. These differences are enabled by establishing a tolerance T as described below (for algorithm 200). It should be noted that these percentages are given in terms of measured values, not true light intensities. Most video cameras have a non-linear "gamma correction" circuit. If the true intensity is I and the gamma of the camera is g (typically 0.45), then the measured value M is given by the equation: $M = I^{**}g$.

The comparator 145 may be a digital device like a digital circuit 140 or any computer 140 (e.g., a personal computer, workstation, etc.) or a set of digital signal processors 140 (that implement the algorithm 200) either alone or installed in a computer. These apparatus are well know in the art. The digital version of the comparator 145 would also use a digitizer 143. The digitizer 143 is a device that digitizes the image signal from the image input device 110. Digitizers 143 and their operation with digital imaging circuits are well known in the art. The digitizer 143 can be located before the memory storage 142, in the computer 140 or anywhere between the video input device 110 and computer 140. If the image input device 110 is a digital camera then a separate digitizer may not be required. The digitizer may be separate from or may be a part of the computer 140. Note that the image may be stored in the computer 140 memory as well as in the storage device 142.

Alternatively, the comparator 145 may be implemented with an analog circuit. (See FIG. 1A.) In this version the storage device 142 would recreate the stored image in an analog form in synchrony with the incoming video image. The storage device might be a short video tape loop, an analog or digital delay line, or a digitizer with memory and a suitable digital-to-analog converter. The analog comparator 145 would then point-wise subtract the two synchronized video signals and determine whether the difference was greater than some preset tolerance (typically a voltage). If the difference was large enough, an analog switch could be used to pass one of the two video signals. When the difference was too small, a reference black level voltage (or some other suitable indication for background areas) could be substituted in place of the original video signal.

The system 100 can also optionally include an output device 150. The output device can be a video display, printer, photo-processor, image processing device, or any of the output devices 150 known in the art. The output device 150 can provide a user with a visual display of the object with and without the background and various processed images of the object and/or background. The output device 150 can also provide the user with control functions by which the user can display alternative images, operate the system 100, or reconfigure the system 100 (e.g., changing which lights 120 or light levels are used). The output of the system 100 might also form the input for some further stage of processing such as recognition of the extracted foreground object 130.

Figure 2:
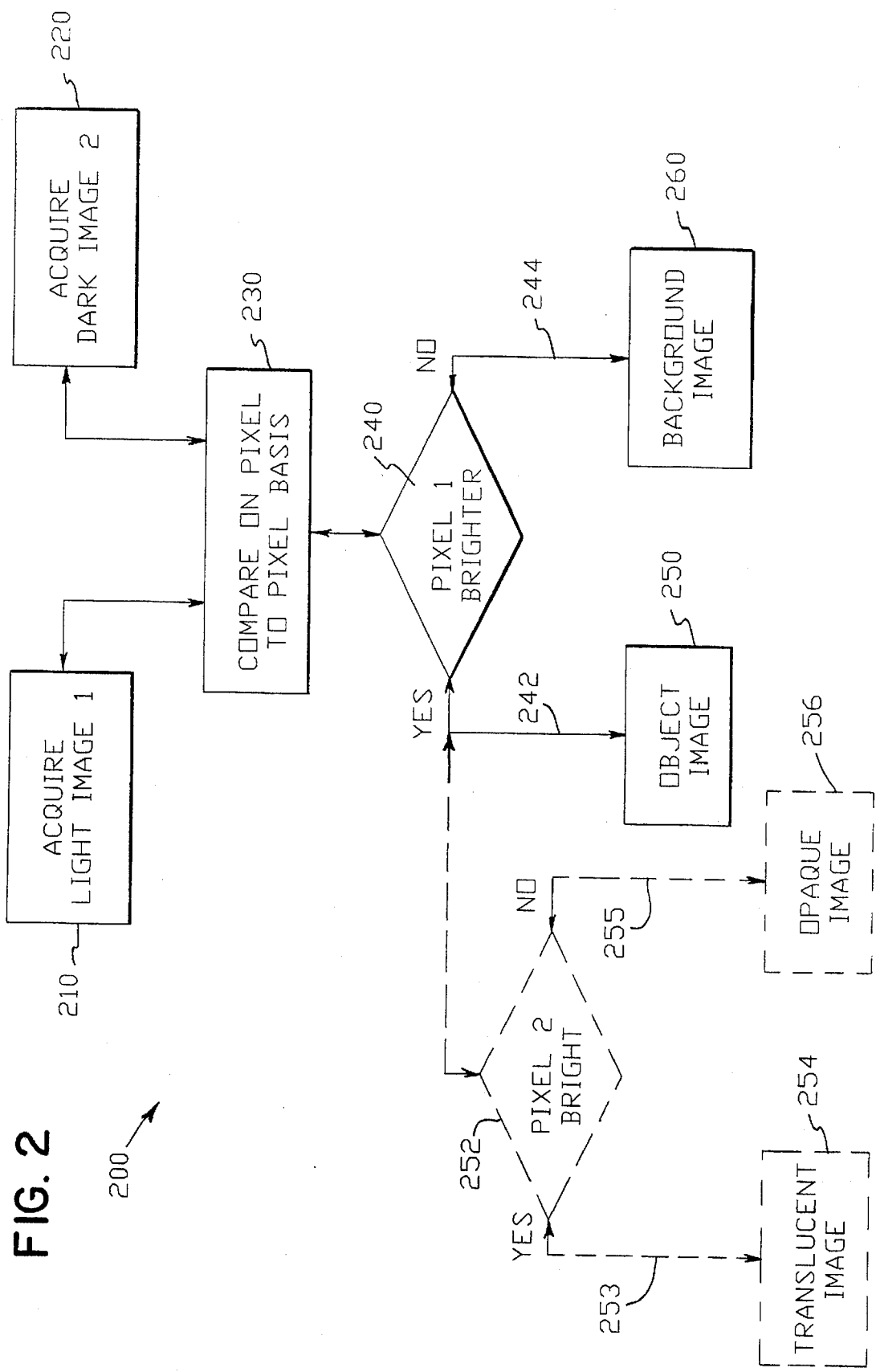
FIG. 2 is a flow chart showing the steps of a preferred method for separating the object from its background.

FIG. 2 is a flow chart showing the steps of a preferred method 200 (also shown in FIG. 1) that is performed by the comparator 145. For the comparator 145 embodied as a computer 140 the method 200 is embodied as a software algorithm.

In step 210, an image (a first image) of the scene is produced with the light 120 switched on or at a higher intensity so as to illuminate object 130 properly. Control 125 controls the light 120 switching.

In step 220, a second image of the scene is produced with the light 120 switched off or set to a level below the level in step 210. The setting of the light 120 should be such that the object 130 appears darker in the second image than in the first image. By performing these novel steps the object 130 can be separated or segmented from the background 135 in the steps below.

Further, the object 130, the background 135, and the image input device 110 should be at the same position in both step 210 and 220 to assure that the first and second images are in spatial registration. Suppose each pixel is numbered starting in the upper left corner of the image then proceeding across the first line then down to the second line in the manner of reading a book. Registration means that each numbered pixel in the first image corresponds to the same area of the scene as the identically numbered pixel in the second image. Proper registration can be ensured by either acquiring the first and second image in quick succession, or by imaging a stationary object 130 against a stationary background 135.

The order of acquiring the first and second image may be reversed. That is, step 220 can be performed before step 210.

In step 230 of the algorithm 200 performed by the digital comparator 145, the first and second images are digitized in the digitizer 143. In the computer 140, each and every pixel in the first digitized image is compared to the respective pixel at the same location in the second digitized image. Pixel by pixel comparisons such as this are known in the image processing art. For example, although the pixels in each pair being compared must correspond to one another (i.e., be in the same respective location in each image), the corresponding pixel pairs in the images can be compared in any order. Further every second or third pixel might be compared.

In step 240, a check is performed on a pixel by pixel basis to determine if a pixel in the first image is brighter than the corresponding pixel in the second image by more than a value T. In any pixel comparison, if the pixel in the first image pixel is brighter than its corresponding pixel in the second image by more than T, the algorithm 200 takes the branch 242 and designates this pixel as corresponding to the object 130. Likewise, if the pixel comparison shows that the pixel in the first image is not brighter than its corresponding pixel in the second image by more than the value T, the algorithm 200 takes the branch 244 and designates this pixel as corresponding to the background 135.

The value of tolerance T may be a constant. A preferred tolerance T is 5% of the largest image intensity. Alternatively, the value of T may vary depending on the positions of pixels in the image or depending on the intensity of the pixel in the dark image. The positional variation of T allows the system to compensate for uneven illumination from source 120. The dark intensity variation of T allows the system to correctly identify foreground objects with low reflectivities (such as black objects). The value T may be fixed or may be recomputed from time to time by the system. It might, for instance, be necessary to change the value of T as light source 120 ages or changes in intensity for some other reason (such as a variation in the AC line voltage supplied to the bulb). This recomputation could be performed on a pair of images of the background with no object (one image of the background 135 highly illuminated and one less so). Since no object is present, both background images should appear to be illuminated the same amount (with ambient light). However, in practice, the light 120 might illuminate the background 135 slightly when the light is switched to a higher intensity. Therefore a tolerance T is chosen for the comparison of the corresponding pixel pairs. The tolerance T could then be set so that only a very small number of pixels in this pair of background images actually passes the test. For example, in a preferred embodiment, T would be set so that fewer than 10% of the pixel pairs differ in illumination more than the tolerance T.

The method for performing steps 230 and 240 using an analog comparator is similar to that described for digital computer 140 above. The first image is stored in the storage device 142. By use of a delay, the stored first image is presented in synchrony with the incoming second image. The analog comparator 145 then point-wise subtracts the two synchronized image signals and determines whether the difference was greater than tolerance T, typically enabled as a voltage. If the difference was larger than T, an analog switch is used to pass one of the two video signals. When the difference is smaller than T, a reference black level voltage (or some other suitable indication for background areas) is substituted in place of the original video signal.

In a preferred embodiment, the steps 230 and 240 are performed on a pixel by pixel basis for each pixel location in the scene image. The result is that the pixels corresponding to the object 130 are collected in a segmented object image 250. Specifically, in the segmented object image, all pixels from the first image that are substantially brighter than their corresponding pixel in the second image are collected in segmented object image at the position they were in the first image. Therefore, the segmented object image corresponds to the desired image of the object 130 removed from the background 135. If needed, the remaining pixels in the image (e.g., the pixels not corresponding to the object 130) can be assigned any desired value and/or can be further processed using known image processing techniques.

In like manner, the pixels corresponding the background 135 are collected in a segmented background image 260. Specifically, all pixels from the first image that are not substantially brighter than the corresponding pixel in the second image are collected in the segmented background image at the position they were in the first image. (In a preferred embodiment, "substantially brighter" means that the difference in illumination between the pixels in the corresponding pixel pair is greater than the tolerance, T.) The segmented background image corresponds to the image of the background 135 with the object 130 removed. If needed, the remaining pixels in the segmented background image (i.e., those corresponding to the removed object pixel locations) can be assigned any desired value and/or further processed using known image processing techniques.

If only the image of the object 130 is desired, steps 244 and 260 need not be performed. Similarly, if only the image of the background 135 is desired, steps 242 and 250 need not be performed.

In an alternative preferred embodiment, a translucent part of the object 130 (for example, a plastic cover) may be separated from an opaque part of the object 130, by adding steps 252, 254, and 256.

In this embodiment, branch 242 goes to step 252 instead of step 250. Before step 252, it has been determined already that the pixel in the first image is brighter than its corresponding pixel in the second image. Step 252 determines if the object 130 pixels of the second image (the object 130 under low illumination) are brighter than a value V, a second tolerance value. If so, branch 253 is taken and the object pixel belongs to the translucent part 254 of object 130. (The object is translucent at this pixel location since some ambient light passed through the object 130 and was imaged at this location when the light 120 was switched to low illumination.) If not, then branch 255 is taken and the pixel belongs to opaque part 256 of object 130. (No ambient light, or an amount below the tolerance, V, is measured through the opaque part of the object 130.) The value V may be constant for each pixel in the second image or may be variable, depending, for example, on the position on the pixel in the second image. Note that the value, V, may further be computed as describe above, from an image of the background 135 alone, by choosing a V such that 95% to 85% of the background image is brighter than V. A preferred value for V is 20% of the brightest image intensity.

In step 254, a translucent object image is created. In this step, each pixel in the first image (which belongs to the object) which corresponds to a pixel in the second image that is brighter than the value V, corresponds a translucent part of object 130 and is stored in a translucent object image. After all pixels of the first and second images are so processed, the translucent object image will contain only the image of the translucent parts of object 130. If needed, the remaining pixels of the translucent object image may be assigned any desired value and/or processed further.

In step 256, an opaque object image is created. In this step, each pixel in the first image (which belongs to the object) which corresponds to a pixel in the second image equal to or darker than the value V, corresponds to an opaque part of object 130 and is stored in the opaque object image 256. After all pixels of the first and second images are so processed, the opaque object image will contain only the image of the opaque parts of object 130. If needed, the remaining pixels of the opaque object image may be assigned any desired value and/or be further processed.

If only an image of the opaque parts of the object 130 is desired, step 254 need not be performed. Similarly, if only an image of the translucent parts of the object 130 is desired, step 256 need not be performed.

In another preferred embodiment, step 252 is combined with step 240 and steps 242 and 250 are removed. This results in the translucent object image or the opaque object image (or both) but not the complete segmented object image 250.

Figure 3:
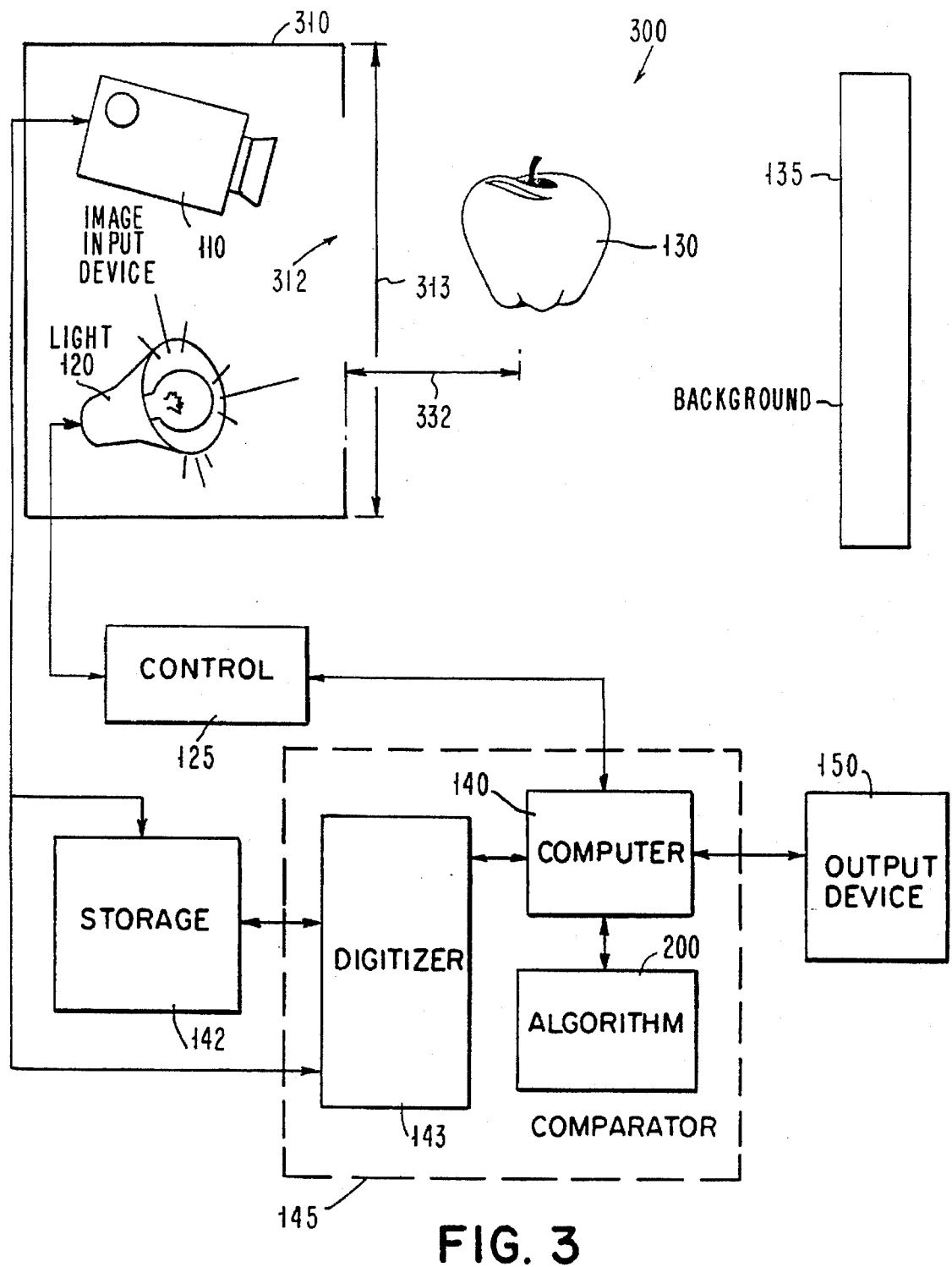
FIG. 3 shows another preferred apparatus with enhancements to image the object independently of the ambient illumination.

FIG. 3 is a block diagram of another preferred embodiment 300 of the present invention. The apparatus 300 is an enhanced version of the apparatus 100 that is capable of imaging object 130 with a controlled light 120, in a manner such that the image of object 130 will be independent of both the background and the ambient illumination.

In order to do this, the apparatus 300 uses an opaque enclosure 310 that encloses the light 120 and image input device 110. The enclosure has a single opening 312 facing the object 130. The opening 312 is of a sufficient size to allow the object 130 to be imaged by the image input device 110 and illuminated by the light 120. The opening can be square, round or any other shape. The intent is to cause enclosure 310 to cast a shadow on the front surface of object 130 (the side toward camera 110). In this embodiment, there is a very short distance 332 between the opening 312 and the object 130. This distance is very short to ensure that the part of the object 130 viewed by the image input device 110 through the opening 312 is illuminated almost exclusively by the light 120. This distance could be zero, i.e. with the object 130 touching the opening 312. Zero is the preferred distance although generally the system performs adequately if the object distance 332 is closer than half the width 313 of enclosure 310. Note that the relative distances between light 120 and object 130 and between light 120 and background 135 must still meet the requirements discussed for FIG. 1. Note that the opening 312 could be covered by a structural element (see 430 in FIG. 4) like a wire mesh, that acts as a support for the object 130 and maintains the object 130 at or near a zero distance 332 from the opening 312.

The apparatus 300 is useful for applications where it is desired to image an object with a controlled spectral distribution of light. For example, if specific measurements are needed to be made of the color of object 130, then it may be required to image object 130 with a specific light as the imaged color of an object is dependent on the incident light. If the object 130 is imaged with the apparatus shown in FIG. 3, then the colors measured from the image will not change with changing background or ambient illumination. One application of this apparatus 300 is in the identification of produce. This use is disclosed in U.S. Pat. No. 6,546,475 to Bolle et al. entitled "Produce Identification System" which is herein incorporated by reference.

Figure 4:
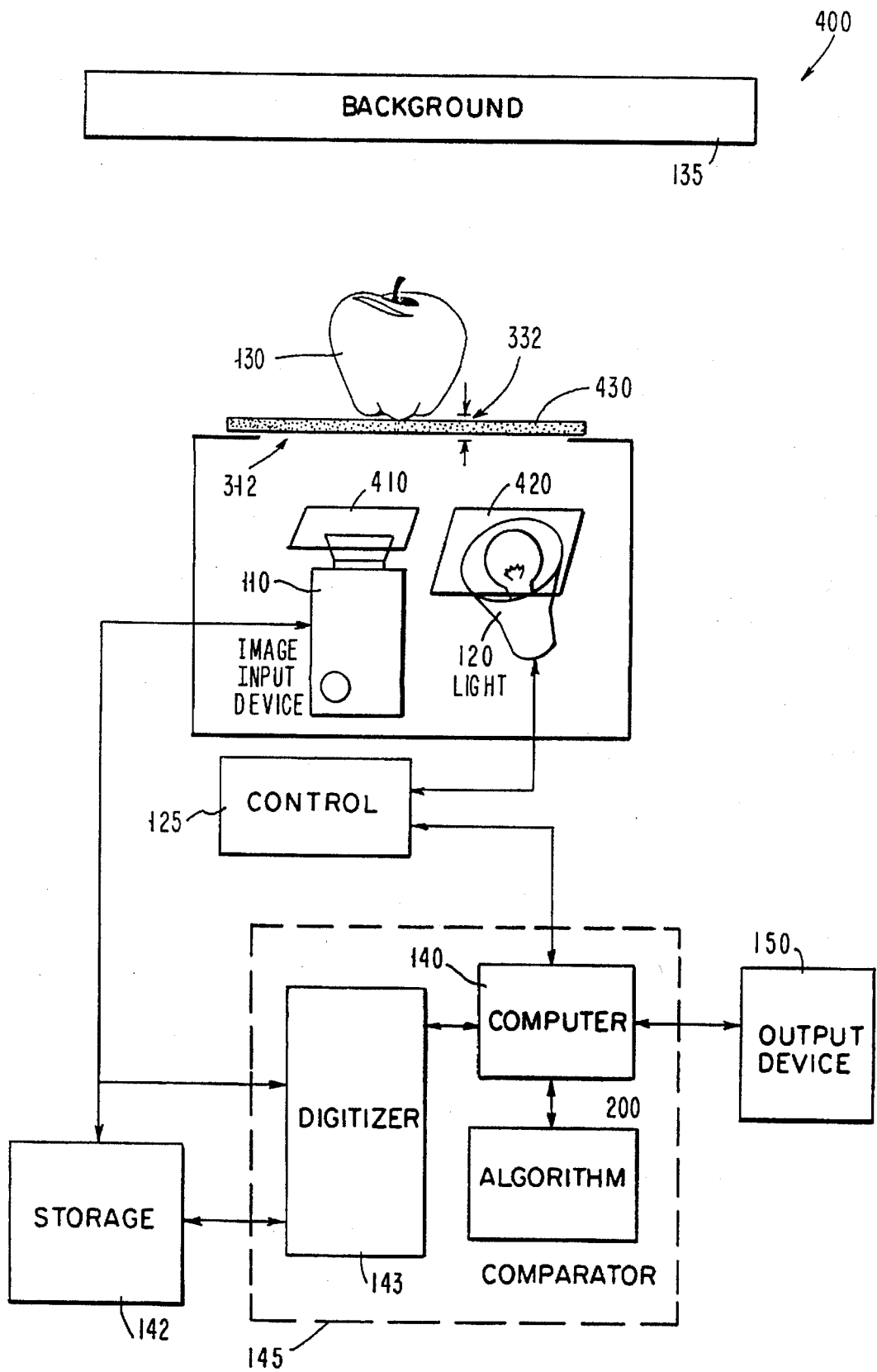
FIG. 4 shows another preferred apparatus with the enhancements that remove glare from the image.

FIG. 4 is a block diagram of a system 400 that shows further enhancements to the apparatus 300 of FIG. 3. The apparatus 400 allows the object 130 to be placed on top of the opening 312 on a transparent support surface 430 (such as a sheet of glass). Surface 430 provides a support for the object 130 and also ensures a suitably close and repeatable distance 332. In addition, the apparatus 400 allows imaging of shiny objects by reducing the glare (specular reflections) from the image. The apparatus accomplishes this by fitting a linear polarization filter 410 to the image input device 110. This is done to ensure that all the light entering image input device 110 first passes through polarizing filter 410. A second linear polarization filter 420 is associated with light 120. If light 120 is partially enclosed either in a box (such as a camera flash) or by a reflector (such as a photographic spotlight) the polarizer need only be placed on the opening in the light assembly which allows the light through. In general, filter 420 must be situated between the light 120 and the opening 312 in a manner insure that the majority of the light reaching the object 130 is polarized. In the preferred embodiment, the direction of the polarization in the filter 420 is exactly orthogonal to the direction of polarization in filter 410.

Given this disclosure, one skilled in the art could come up with alternative equivalent embodiments that are within the scope of this invention.

We claim:

1. An image processing system for separating one or more objects in a scene from a background of the scene, comprising:

a controllable light source for illuminating the scene, the controllable light source having an on illumination level and a reduced illumination level, the controllable light source positioned at an object distance from the object and a background distance from the background, a reflectance of light from the object divided by the square of the object distance being greater than a reflectance of light from the background divided by the square of the background distance when the controllable light source is at the on illumination level and the reduced illumination level;

an image input device taking two or more images of the the scene, a first scene image taken with the controllable light source on and a second scene image taken with the controllable light source at the reduced illumination level, the first scene image having an object image brighter than the object image in the second scene;

a comparator comparing the first and second scene images, one or more pixels being object pixels that are brighter in the first scene image than in the second scene image; and a comparator designator designating the object pixels as an object image separate from a background image of the background of the scene.

2. A system, as in claim 1, where one or more pixels are background pixels, the background pixels having the same brightness, within a tolerance, in the first and second scene images, and the comparator designator designating the background pixels as a background image of the background of the scene instead of designating the object image.

3. A system, as in claim 1, where one or more pixels are background pixels, the background pixels having the same brightness, within a tolerance, in the first and second scene images and the comparator designator designating the background pixels as a background image of the background of the scene in addition to the object image.

4. A system, as in claim 1, where the comparator designator is a digital circuit for selecting the pixels that were brighter in the first scene image than the second scene image.

5. A system, as in claim 4, where the digital circuit is a computer and one or both of the scene images is stored on a memory storage device before being compared.

6. A system, as in claim 1, where the comparator designator is an analog circuit which subtracts and tolerances two synchronized video signals.

7. A system, as in claim 1, where the object is closer to the light source than the background and the illumination of the scene by the light source makes the object brighter, by more than a tolerance, than a brightness of the background.

8. A system, as in claim 1, where the reduced illumination level of the light source is off.

9. A system, as in claim 1 where the angle formed by the image input device, the object, and the light source is between 0 and 15 degrees.

10. A system, as in claim 1, where the image input device is a camera.

11. A system, as in claim 1, further comprising an output device.

12. A system, as in claim 1, where a part of the object image is further separated into a dark part that was dark in the first scene image and a light part that was light in the first scene image, the dark part being an image of one or more opaque parts of the object and the light part being an image of one or more translucent parts of the object.

13. An image processing system for separating one or more objects in a scene from a background of the scene, comprising:

a controllable light source for illuminating the scene, the controllable light source having an on illumination level and a reduced illumination level, the controllable light source positioned at an object distance from the object and a background distance from the background, a reflector of light from the object divided by the square of the object distance being greater than a reflectance of light from the background divided by the square of the background distance when the controllable light source is at the on illumination level and the reduced illumination level;

an image input device taking two or more images of the scene, a first scene image taken with the controllable light source on and a second scene image taken with the controllable light source at the reduced illumination level, the first scene image having an object image of each of the objects brighter than the object image in the second scene;

an opaque enclosure that encloses the image input device and the light source, the enclosure having an opening facing the object so that the light can illuminate the object and the image input device can image the object, the enclosure opening being placed a first distance from the object so that there is a reduction in the ambient light reflected from the object to the imaging input device;

a comparator for comparing the first and second scene images, one or more pixels being object pixels that are brighter in the first scene image than in the second scene image; and a comparator designator designating the object pixels as the object image separate from a background image of the background of the scene.

14. A system, as in claim 13, where there is a transparent cover over the enclosure opening.

15. A system, as in claim 14, where the transparent cover supports the object.

16. A system, as in claim 13, where the light source is a polarized light used to reduce glare from the objects and from the supporting surface.

17. A system, as in claim 16, where a linear polarizer is placed over the light source and another linear polarizer is placed over the image input device such that the polarization axes of the two polarizers are perpendicular.

18. A system, as in claim 13, where there is a mesh covering the opening in the enclosure for supporting the object.

19. A system, as in claim 1, where more than two images are taken, each image being taken at a different light intensity of the controllable light source.

* * * * *